United States Patent [19]

Sato et al.

[11] Patent Number: 4,794,969
[45] Date of Patent: Jan. 3, 1989

[54] HEAVY DUTY PNEUMATIC BIAS TIRE

[75] Inventors: Tetsuhiko Sato; Osamu Inoue, both of Tokyo, Japan

[73] Assignee: Bridgestone Corporation, Tokyo, Japan

[21] Appl. No.: 943,005

[22] Filed: Dec. 18, 1986

[30] Foreign Application Priority Data

Dec. 20, 1985 [JP] Japan .................. 60-285823

[51] Int. Cl.$^4$ .................. B60C 15/05; B60C 9/06
[52] U.S. Cl. .................. 152/545; 152/554; 152/559
[58] Field of Search .............. 152/539, 540, 545, 552, 152/554, 548, 559

[56] References Cited

U.S. PATENT DOCUMENTS

| 3,982,580 | 9/1976 | Inoue et al. .................. 152/559 X |
| 4,029,137 | 6/1977 | Suydam .................. 152/545 X |
| 4,263,957 | 4/1981 | Abe .................. 152/545 |
| 4,340,105 | 7/1982 | Abe .................. 152/545 |
| 4,349,062 | 9/1982 | Tsurunaga et al. .................. 152/545 X |

Primary Examiner—Michael W. Ball
Assistant Examiner—Ramon R. Hoch
Attorney, Agent, or Firm—Sughrue, Mion, Zinn, Macpeak & Seas

[57] ABSTRACT

A heavy duty pneumatic bias tire having a thick case gauge is disclosed, which comprises a carcass of a bias structure composed of a plurality of carcass plies each containing organic fiber cords and a plurality of bead rings spaced from each other in each of bead portions of the tire, both end portions of a plurality of the carcass plies being turned-back around each of the bead rings from the inside to the outside of the tire. In the tire of this type, the ends of the carcass plies turned-back around the bead rings except the axial innermost bead ring are positioned in the outside of the region "C" between the planes "A" and "B" in each of sidewall portions of the tire.

10 Claims, 8 Drawing Sheets

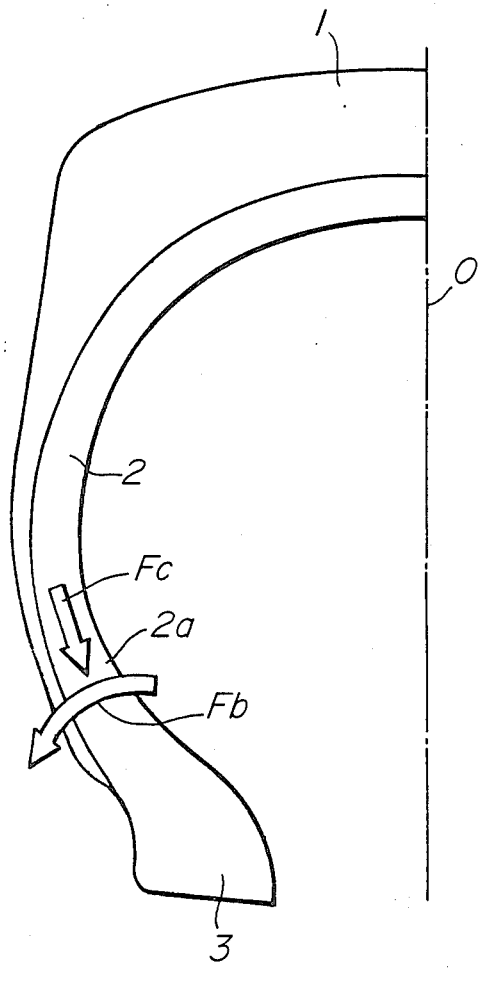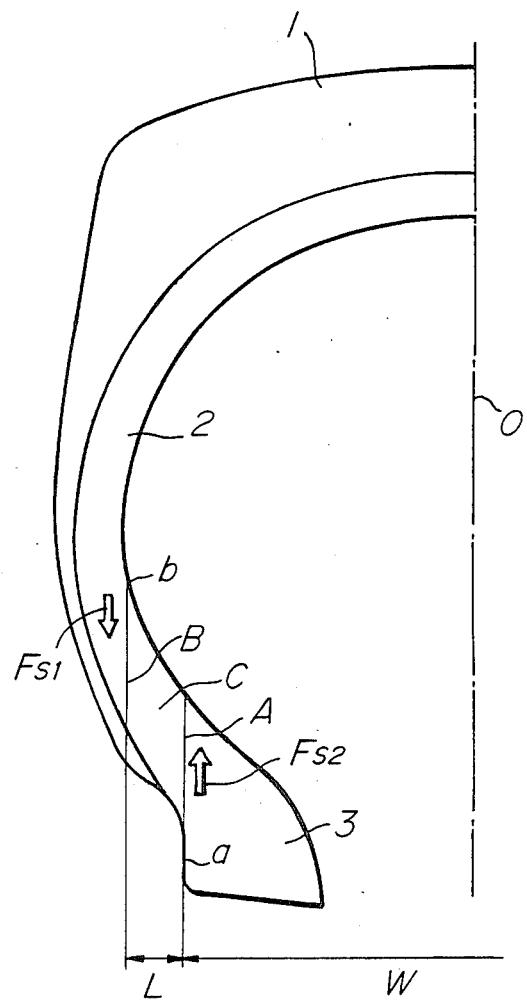

HEAVY DUTY PNEUMATIC BIAS TIRE

BACKGROUND OF THE INVENTION

1. Field of the Invention

The present invention relates to heavy duty pneumatic bias tires. More particularly it relates to an improvement in durability of such a heavy duty pneumatic bias tire wherein a carcass of a bias structure is composed of a plurality of carcass plies each containing organic fiber cords arranged at a cord angle with respect to the median equational plane of the tire, a plurality of bead rings are embedded in each of bead portions and the end portions of the carcass plies are turned-back around each of the bead rings from the inside to the outside of the tire.

2. Related Art Statement

Heretofore, in trucks, construction vehicles and the like there have been employed large heavy duty pneumatic bias tires having a large number of carcass plies in order to provide a necessary strength corresponding to the condition for using.

Such a conventional heavy duty pneumatic bias tire, for example as shown in FIG. 9, has a tread portion 1, a pair of sidewall portions 2, bead portions 3 at the radially inner ends of the sidewall portions 2 and a plurality of carcass plies 4 toroidally extended from the tread portion 1 to the sidewall portions 2 and the bead portions 3. The carcass plies 4 are layered with their organic fiber cords arranged at an angle to the median equational plane of the tire.

Particularly, in such a heavy duty pneumatic bias tire having twenty or more carcass plies, in order to securely retain the end portions of the carcass plies 4 in the bead portions 3 of the tire and to closely seat the bead portions against a wheel rim 5, a plurality of bead rings 6 are embedded in each of the bead portions 3 and spaced from each other in the axial direction. The end portions of a plurality of carcass plies are turned-back around each of the bead rings 6 from the inside to the outside of the tire.

The height of the turned-back ply ends 4a of the carcass plies 4 are determined by balance of the carcass rigidity. The turned-back ply ends 4a are usually terminated in the sidewall portions 2 of the tire at a different height such that the thickness of the carcass smoothly increases as it comes near the bead portion 3. The plurality of turned-back ply ends 4a are therefore spaced in the direction from the bead portion 3 to the sidewall portion 2 by a ply step S of usually 15-40 mm corresponding to the distance between the successive turned-back ply ends as shown in FIG. 9.

Thus, the heavy duty pneumatic bias tire having a large actual number of carcass plies and a thick case gauge, includes many turned-back ply ends of carcass plies which are turned-back around each of the bead rings in the bead portions 3 and the sidewall portions 2 of the tire.

These turned-back ply ends have been pointed out as weak points in tire structure since the exposed cut ends of organic fiber cords such as nylon cords directly contact the surrounding rubber having a rigidity different from that of the fiber cord.

Heretofore, a countermeasure for eliminating such a weak point is by covering the ply ends with a rubber sheet or increasing the gauge of rubber surrounding the ply ends.

SUMMARY OF THE INVENTION

An object of the invention is to provide a heavy duty pneumatic bias tire which eliminates the aforementioned drawbacks and greatly improves durability.

The inventors have made studies in order to solve the problems on the durability of such heavy duty pneumatic bias tire having a large actual number of carcass plies and a thick case gauge as mentioned above and found that drawbacks such as break out of ply cords and separation of carcass causing a burst of tire are originated in the carcass ply ends located in a specified region adjacent to the bead portion, i.e. a region "C" between a plane "A" parallel with the tire equational plane "0" at the wheel rim end "a" and a plane "B" parallel with the tire equational plane "0" at an axial outermost point "b" on the inner surface of the sidewall and thus the durability of the tire is extremely deteriorated.

In general, as illustrated in FIGS. 2 and 3 an annular structure such as a tire is subjected to compression force $F_c$, bending moment $F_b$ and shearing force $F_{S1}$, $F_{S2}$ in the bead portion 3 and the portion 2a of the sidewall portion 2 adjacent to the bead portion at the ground contact side of tire under heavy load.

A conventional pneumatic bias tire having a relatively small actual number of carcass plies and a thin sidewall portion 2a is subjected to the compression force $F_c$ and the bending moment $F_b$ rather than the shearing force $F_{S1}$, $F_{S2}$. Thus, the sidewall portion 2a is elastically bended under the heavy load and the compression strain increases and concentrates in a ply arranged at outermost in the sidewall portion 2a, but the compression strain does not increase in the inner portion of the carcass in which the carcass ply ends exist.

However, the heavy duty pneumatic tire of aforementioned type has a large actual number of carcass plies such that the carcass is composed of twenty or more carcass plies and a thick case gauge such that a plurality of bead cores are arranged in each of the bead portions and spaced from each other in the axial direction. In such a heavy duty pneumatic tire and particularly, a tire of this type wherein an axial distance "L" between the plane "A" parallel with the tire equational plane "0" at the wheel rim end "a" and the plane "B" parallel with the tire equational plane "0" at the axial outermost point "b" on the inner surface of the sidewall is 0.02 or more times of the width of the wheel rim, shearing deformation caused by shearing forces $F_{S1}$ and $F_{S2}$ rather than compression force $F_c$ and bending moment $F_b$ mainly generates at the ground contact side of the tire under heavy load. The main compression strain (the shearing strain may be resolved into tensile strain component and compression strain component and this compression strain component is the main compression strain) increases in the inner portion (the region "C" between the planes "A" and "B") of the carcass in which the carcass ply ends exist and the aforementioned drawbacks are generated by concentration of strain at the carcass ply ends 4a.

The inventors have found and checked up the above matters by observing many broken tires and by testing deformation behaviors of tires.

FIG. 4 shows a distribution of strain in the bead portion 3 and the sidewall portion 2a adjacent to the bead portion in a heavy duty pneumatic bias tire of thick case gauge type having a large actual number of carcass plies and a plurality of bead rings embedded in each of the bead portions 3 in which a plurality of carcass plies are turned-back around each of the bead rings from the inside to the outside of the tire. It will be seen from this Figure that the compression strain in the region "C" between the planes "A" and "B" is extremely higher than that in the outside of the region "C". For example, the compression strain at a point "$B_1$" is 7.5% and the compression strain at a point "$C_1$" is 15% which is two times higher than the point $B_1$.

It will be seen from FIG. 4 that the aforementioned compression strain in the region "C" becomes larger at the outer portion in the axial direction, i.e. the direction of rotational axis of the tire and is relatively small at the inner portion. Therefore, the turned-back ply ends may be located at the inner portion in the region "C". That is, the ends of carcass plies turned-back around the bead ring positioned at the innermost in the axial direction are permitted to exist in the region "C". The phenomenon of generating such a large compression strain in the region "C" between the planes "A" and "B" as shown in FIG. 4 remarkably appears in tires applied with a heavy load and particularly large tires having large actual numbers of carcass plies.

The present invention bases on such a new recognition that fatigue of the organic fiber cords and rubber is accelerated due to concentration of stress and strain in the region "C" in which the compression strain is locally high and the drawbacks such as break out of the ply cords and separation of carcass are originated in the carcass ply ends forming discontinuous points of low strength in the region "C" and thus the durability of the tire is extremely deteriorated.

According to the present invention, there is the provision of in the heavy duty pneumatic bias tire comprising a carcass of bias structure composed of a plurality of carcass plies each containing organic fiber cords arranged at a cord angle with respect to the median equational plane and a plurality of bead rings spaced from each other in each of bead portions of the tire, both end portions of a plurality of the carcass plies being turned-back around each of the bead rings from the inside to the outside of the tire and an axial distance between a plane "A" parallel with the equational plane at a wheel rim end "a" and a plane "B" parallel with the equational plane at the axial outermost point "b" on the inner surface of the sidewall of the tire being 0.02 or more times of the width of the wheel rim, the improvement wherein the ends of the carcass plies turned-back around the bead cores except the axial innermost bead core are positioned in the outside of the region "C" between the planes "A" and "B".

According to the present invention, by positioning the carcass ply ends in the outside of the region "C" in which an extremely high compression strain generates it is possible to prevent the stress and strain from concentrating at the carcass ply ends and thereby to reduce the rate of burst due to the breakout of the carcass cords and the separation of carcass to improve the durability of the tire.

These and other objects, features and advantages of the invention will be well appreciated upon reading of the following description of the invention when taken in conjunction with the attached drawings with understanding that some modifications, variations, and changes of the same could be easily done by the skilled in the art to which the invention pertains without departing from the spirit of the invention or the scope of the claims appended hereto.

BRIEF DESCRIPTION OF THE DRAWINGS

FIG. 2 is a diagrammatic sectional view illustrating a deformation in the ground contact side of a tire having a thin case gauge under heavy load;

FIG. 3 is a diagrammatic sectional view illustrating a deformation in the ground contact side of a tire having a thick case gauge under heavy load;

DESCRIPTION OF THE PREFERRED EMBODIMENT

Figure 1:
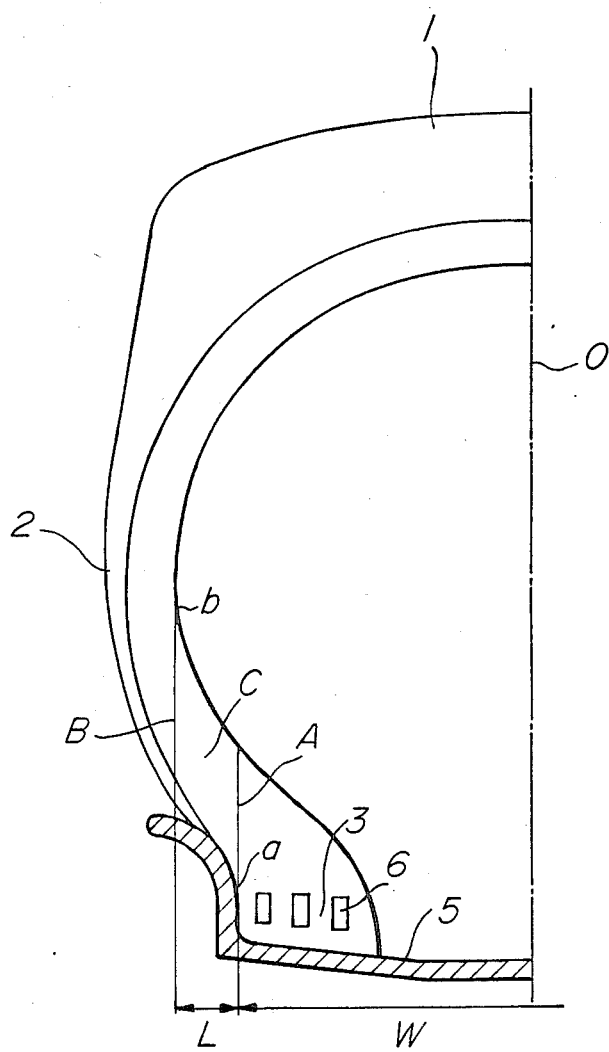
FIG. 1 is a diagrammatic sectional view taken along the meridian of the tire illustrating the structure of the tire according to the present invention.
Figure 4:
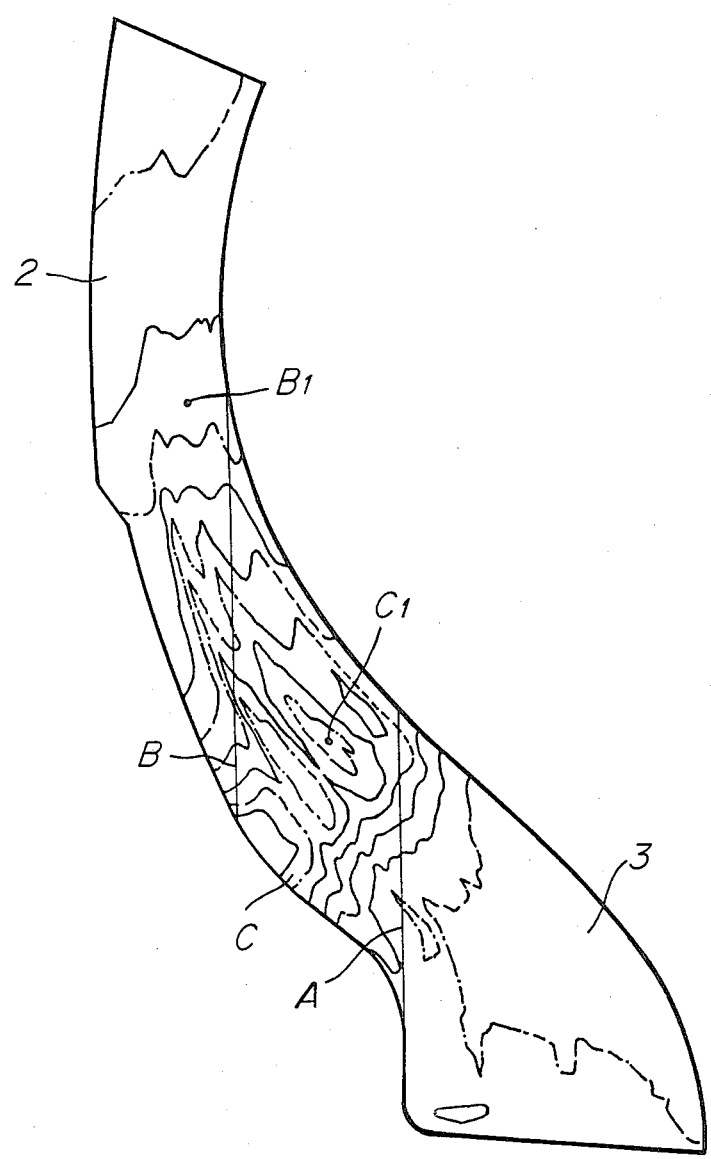
FIG. 4 is a fragmentary sectional view, on an enlarged scale, of the bead portion and the sidewall portion adjacent to the bead portion of the tire having the thick case gauge illustrating the distribution of compression strain in the ground contact side of the tire under heavy load.
Figure 5:
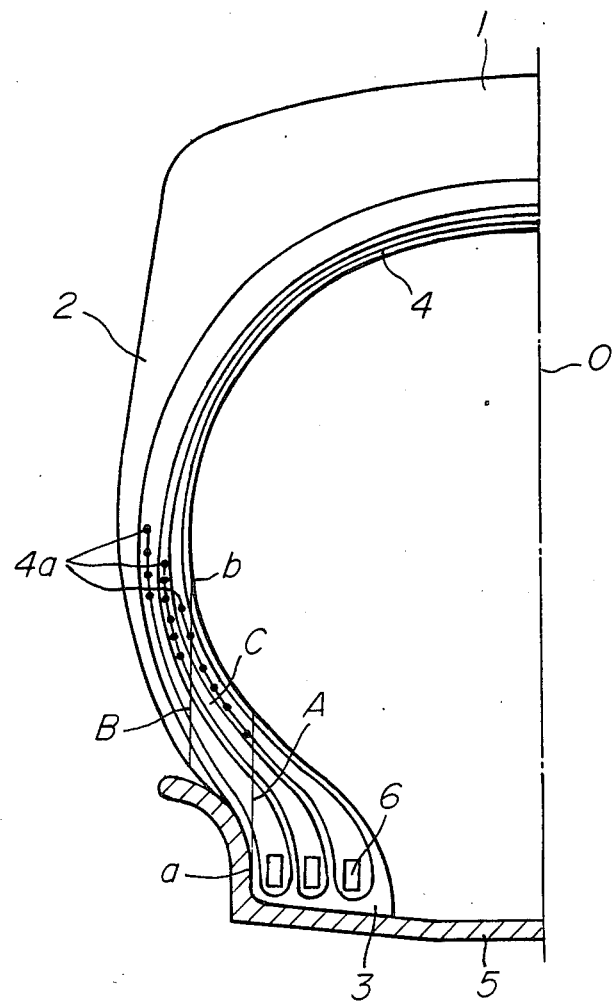
FIGS. 5 to 8 are diagrammatic sectional views taken along the meridian of the tire according to various embodiment of the present invention.

FIG. 5 shows the first embodiment of the present invention. The tire in this embodiment is of a tire size of ORS 2400-49 42 PR and has twenty carcass plies in actual number of nylon cords 1890 d/2. The actual number of carcass plies turned-back around each of bead rings are six plies for first bead ring, six plies for second bead ring and four piles for third ring and the remaining four plies are cut plies.

In this embodiment, the ends of the carcass plies turned-back around the bead rings located at the axial outermost and the center are spaced by a narrow step of 20 mm and positioned on the tread side in the outside of the region "C" between the planes "A" and B".

Figure 6:
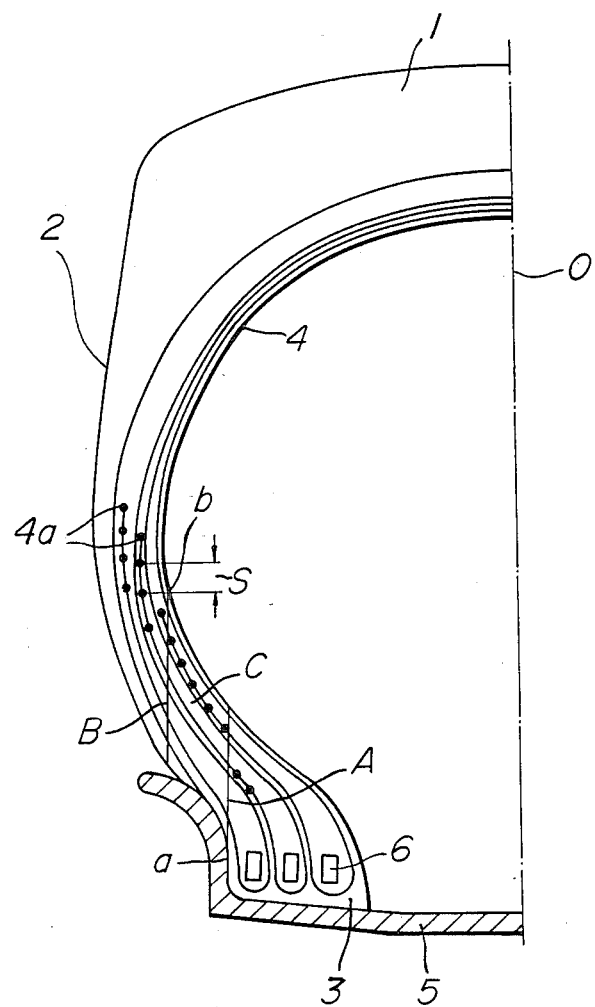

FIG. 6 shows the second embodiment of the present invention. The tire in this embodiment is similar to the tire size and the structure of the first embodiment. In this embodiment, the ends of the carcass plies turned-back around the bead rings located at the axial outermost and center are spaced by steps partially narrowed and positioned on both of the tread and bead sides in the outside of the region "C" between the planes "A" and "B".

Figure 7:
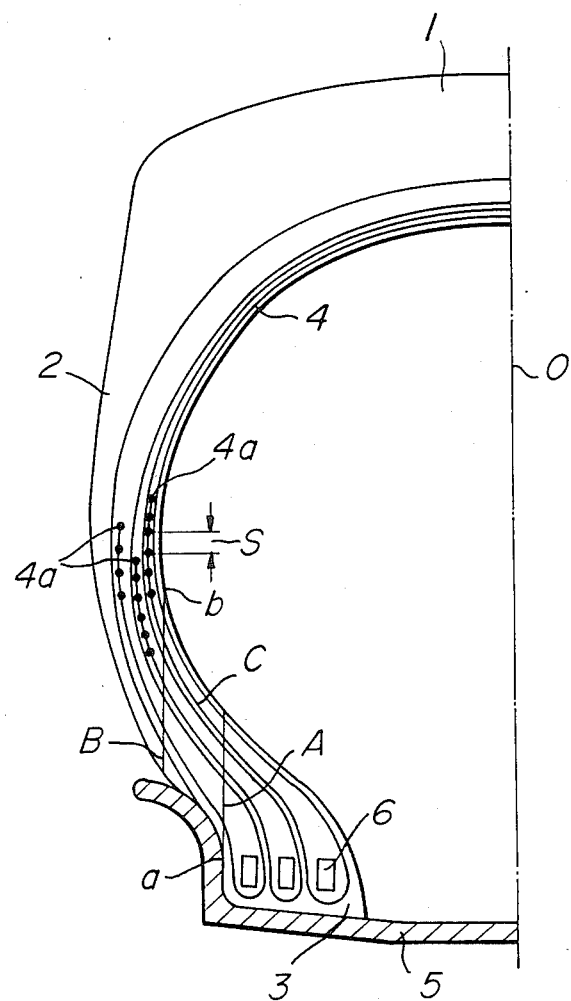

FIG. 7 shows the further preferable third embodiment of the present invention.

The tire in this embodiment is similar to the tire size and the structure of the first embodiment. In this embodiment, all the carcass ply ends are spaced by narrow steps of 20 mm and positioned on the tread side in the outside of the region "C" between the planes "A" and "B". The height of the highest inner ply end 4a by measured along a straight line from the inner bead wire head is 360 mm and the height of the highest center ply end is 330. Either of these height of the ends is higher than that of the conventional.

Figure 8:
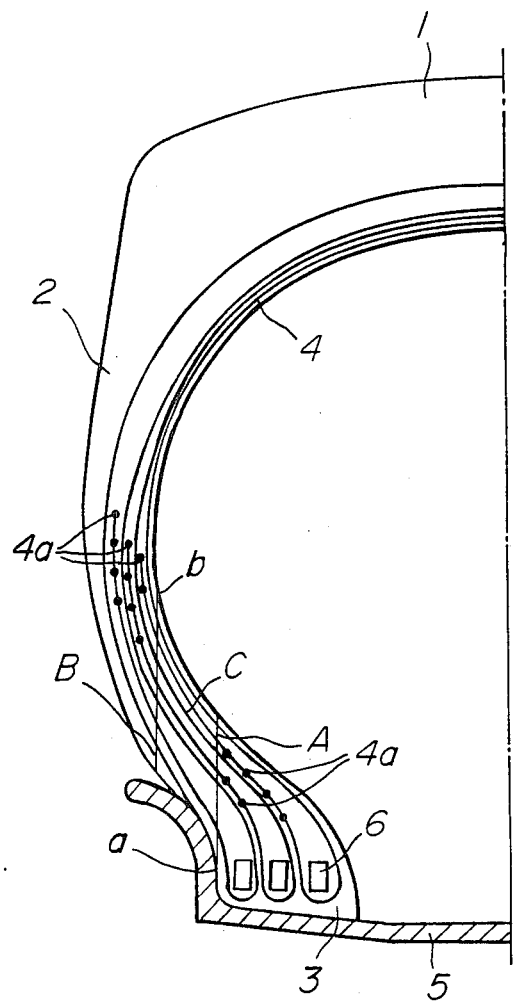
Figure 9:
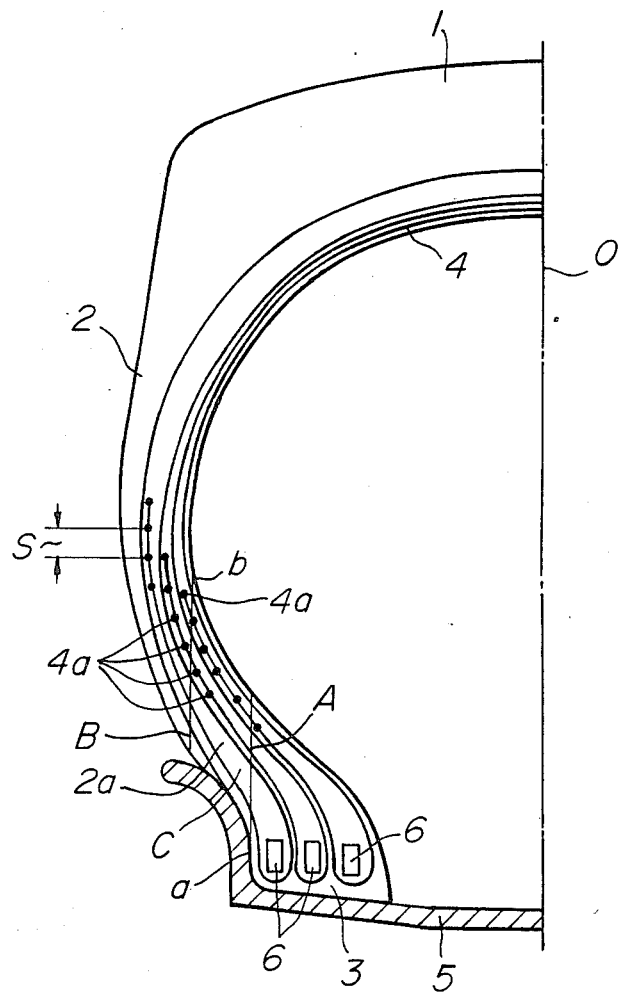
FIG. 9 is a diagrammatic sectional view taken along the meridian of the conventional tire.

FIG. 8 shows the fourth embodiment of the present invention. The tire in this embodiment is similar to the tire size and the structure of the first embodiment. In this embodiment, all the carcass ply ends are positioned in the outside of the region "C" between the planes "A" and "B", but on both of the tread and bead side. The distance of one step is 30 mm which is the same as the conventional. Either the height of the highest inner ply end 4a and the highest center ply end 4a is 315 mm which is partially higher than the conventional.

In order to confirm the effect carried by the present invention, comparison tests were made as follows:

(1) Measurement of compression strain in the portion adjacent to the carcass ply ends.

The measurement was made by using tires of 1800-25 32 PR with an inner pressure of 5.6 kg/cm² under a load of 12.8 tons. When the measurement is represented by an index on a base that compression strain measured about carcass ply ends positioned in the outside of the region "C" between the planes "A" and "B" is 100, compression strain measured about the carcass ply ends positioned within the region "C" were 180–260.

(2) Comparison test of durability of the tire.

Running tests were made by using tires of 1800-25 32 PR at a speed 13 km/hr in the test room. The conventional tires bursted due to breakout of the ply cords after 2100 hours, but the tires of the present invention run out for 3000 hours.

What is claimed is:

1. A heavy duty pneumatic bias tire comprising; a carcass of bias structure composed of a plurality of carcass plies each containing organic fiber cords and a plurality of bead rings spaced from each other in each of bead portions of the tire, both end portions of a plurality of the carcass plies being turned-back around each of the bead rings from the inside to the outside of the tire, an axial distance "L" measured between a plane "A" parallel with the equational plane at each of the opposite ends "a" of the width "W" between the bead heels of said tire when mounted, and a plane "B" parallel with the equational plane at the axial outermost point "b" on the inner surface of each of sidewalls of the tire being at least 0.02 times the width "W", wherein the ends of the carcass plies turned-back around the bead rings except the axial innermost bead ring in each of the bead portions are positioned outside of a region "C" which includes all positions of the tire sidewalls located between the planes "A" and "B" in each of the sidewalls.

2. A heavy duty pneumatic bias tire according to claim 1, wherein the carcass is composed of twenty at least carcass plies.

3. A heavy duty pneumatic bias tire according to claim 1, wherein at least six carcass plies are turned-back around the bead ring located at the axial innermost in each of the bead portions of the tire.

4. A heavy duty pneumatic bias tire according to claim 1, wherein the organic fiber cords are arranged at a cord angle with respect to the median equational plane of the tire.

5. A heavy duty pneumatic bias tire according to claim 1, wherein the bead rings are spaced from each other in the axial direction of the tire in each of the bead portions of the tire.

6. A heavy duty pneumatic bias tire according to claim 1, wherein the ends of the carcass plies turned-back around the bead rings except the axial innermost bead ring are positioned on the tread side of the sidewall portion in the outside of the region "C".

7. A heavy duty pneumatic bias tire according to claim 1, wherein the ends of the carcass plies turned-back around the bead rings except the axial innermost bead ring are positioned on both of the tread side and the bead side of the sidewall portion in the outside of the region "C".

8. A heavy duty pneumatic bias tire according to claim 1, wherein the ends of the carcass plies turned-back around all the bead rings are positioned in the outside of the region "C".

9. A heavy duty pneumatic bias tire according to claim 8, wherein the ends of the carcass plies are positioned on the tread side of the sidewall portion in the outside of the region "C".

10. A heavy duty pneumatic bias tire according to claim 8, wherein the bead rings are positioned on both of the tread side and the bead side of the sidewall portion in the outside of the region "C".

* * * * *